March 23, 1965     F. K. H. NALLINGER     3,174,538
HEATING INSTALLATION, ESPECIALLY FOR MOTOR VEHICLES
Filed June 29, 1959
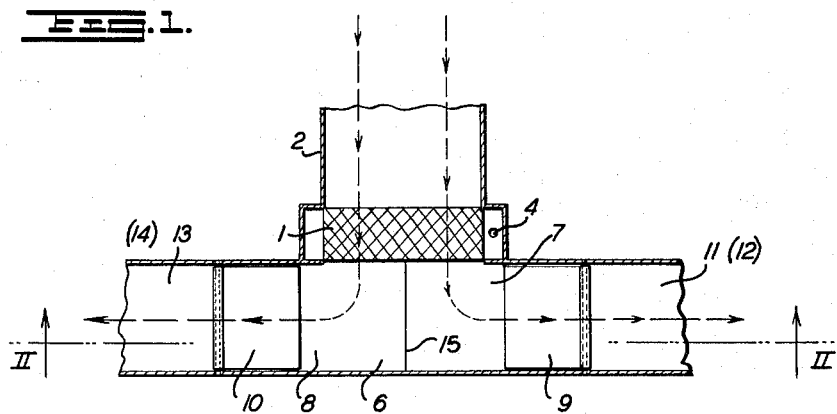
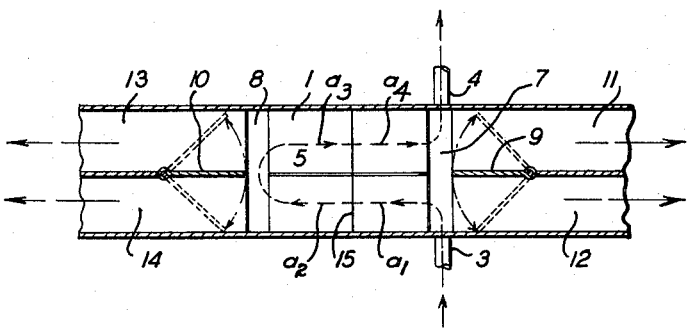
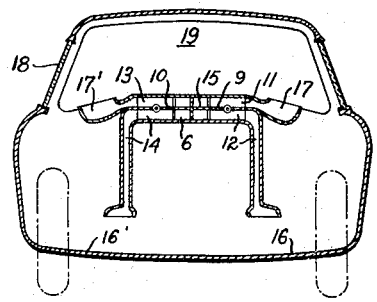
INVENTOR
FRIEDRICH K. H. NALLINGER
BY *Dicke, Craig and Freudenberg*
ATTORNEYS

United States Patent Office 3,174,538
Patented Mar. 23, 1965

3,174,538
HEATING INSTALLATION, ESPECIALLY FOR MOTOR VEHICLES
Friedrich K. H. Nallinger, Stuttgart, Germany, assignor to Daimler-Benz Aktiengesellschaft, Stuttgart-Unterturkheim, Germany
Filed June 29, 1959, Ser. No. 823,500
Claims priority, application Germany, July 2, 1958, D 28,433
6 Claims. (Cl. 165—41)

The present invention relates to a further development and improved construction of a ventilating installation for motor vehicles provided with a heating and/or cooling system.

The present invention aims primarily at an arrangement in which a good distribution of the heated and/or cooled air to the various parts or sections of the vehicle interior space may be achieved with the fewest and simplest possible means.

The present invention essentially consists in providing a passage or flow through the heater and/or cooler by the heating or cooling medium in such a manner that the heating or cooling effect thereof decreases continuously from the inlet point to the exit point of the heating or cooling medium and that the branch air conduits or lines are operatively connected therewith in the following sequence corresponding to the desired cooling of the relatively warm air flow or the desired heating of the relatively cool air flow resulting therefrom when all the control members are essentially in the center position thereof: A line or conduit leading to the foot space of the passenger seated alongside the driver, a line or conduit leading to the foot space of the vehicle driver, a line or conduit leading to the defroster nozzles, especially for the windshield and the lateral window panes on the driver side, and a line or conduit leading to the defroster nozzles on the side of the passenger seated alongside the driver.

The present invention renders possible an effective and appropriate arrangement for both vehicle sides while utilizing only a single heater or cooling member and only two control valves or flaps.

Accordingly, it is an object of the present invention to provide a distributing arrangement for a heating and/or cooling system, especially for motor vehicles, which is simple in construction, utilizes a minimum of parts and achieves an effectual distribution of the heated and/or cooled air into the various places or sections within the vehicle interior space.

Another object of the present invention is the provision and arrangement of a heat exchanger and the particular flow of the cooling or heating medium therethrough in relation to the branch conduits leading to the various outlets within the vehicle in such a manner as to adapt the system to the heating and cooling requirements of the vehicle interior space in a most appropriate and advantageous manner.

A still further object of the present invention resides in the provision of a distributing arrangement for the ventilation system of a motor vehicle which requires only a single heat exchanger for selectively heating and/or cooling the ventilating air and only two control members for achieving an effectual and appropriate control of the heated or cooled ventilating air of the system into the various parts of the vehicle.

These and other objects, features and adavntages of the present invention will become more obvious from the following description when taken in connection with the accompanying drawing which shows, for purposes of illustration only, one embodiment in accordance with the present invention and wherein:

FIGURE 1 is a schematic plan view of a distributing arrangement for a motor vehicle heating or cooling installation in accordance with the present invention, FIGURE 2 is a schematic cross-sectional view of the distributing arrangement of FIGURE 1 taken along line II—II, and FIGURE 3 is a transverse sectional view of an automotive vehicle showing the disposition therein of the distributing arrangement shown in FIGURES 1 and 2.

Referring now to the drawing wherein like reference numerals are used throughout the two views to designate corresponding parts, a single heat exchanger 1 of any suitable, appropriate construction is provided for the heating or cooling system of a motor vehicle ventilation installation. Fresh air may thereby flow through the heat exchanger 1 after being scooped up by an air scoop aperture (not shown) of any suitable shape and arranged in front of the vehicle which is connected with the heat exchager 1 through the line or conduit 2. The heat exchanger 1 is opreatively connected with the cooling circulatory system of the driving engine in such a manner that the heated cooling water flows into the heat exchanger 1 from below on one side thereof as at 3 and is discharged therefrom or flows off from the heat exchanger 1 on the same side on top thereof as at 4. Furthermore, the heat exchanger 1 is subdivided, for example, by a horizontal partition wall 5 into upper and lower half portions in such a manner that the flow of the heating medium from the lower inlet place 3 proceeds at first from right toward the left in the lower heat exchanger half portions and from left toward the right in the upper heat exchanger half portions by means diagrammatically indicated by the arrow sections $a_1$, $a_2$, $a_3$ and $a_4$ is shown in FIGURE 2. This may be achieved in any suitable known manner which produces the desired flow pattern of the cooling medium through the heat exchanger 1, for example, by means of a known parallel flow arrangement.

An air collecting chamber 6 provided with two oppositely disposed lateral air discharge apertures 7 and 8 is operatively connected behind the heat exchanger 1 in the ventilating system according to the present invention. One pivotal control valve member or flap 9 and 10 each is disposed behind a respective discharge aperture 7 and 8 whereby each control valve member or flap 9 and 10 may be selectively positioned into the flow path in front of the upper or lower lines 11 and 12 or lines 13 and 14, respectively, so as to selectively close off or block one or the other discharge line.

The adjustment of both control valve members 9 and 10 may thereby be realized manually, especially by any suitable control means disposed within reach of the driver, or also by any known automatic adjusting mechanism.

Operation

The operation of the distributing arrangement for the heating and/or cooling system in accordance with the present invention is as follows:

As may be readily seen from FIGURE 1 of the drawing, the fresh air flowing through line or conduit 2 into the heat exchanger 1 and which passes over into the air chamber 6 after passage through the heat exchanger 1 is evenly distributed therefrom toward both sides of the air chamber 6 into the lines 11, 12, 13 and 14 with the control valve members 9 and 10 in the center positions thereof, as illustrated in FIGURE 2.

As may also be readily determined from FIGURE 2, the warmest section $a_1$ of the heat exchanger 1, i.e., the section which produces the greatest heat transfer, lies directly in front of line 12 so that the air subjected to the greatest heating effect and therewith the relatively warmest air reaches the conduit portion disposed directly in front of line 12. By the same token, the coolest section $a_4$ of the heat exchanger 1, i.e., the one effecting the smallest heat transfer, is disposed directly in front of the line 11. The section of the lower half portion corresponding to arrow section $a_2$ is of a lower temperature and produces a heat effect less than that of first section $a_1$, and the section of the upper half portion corresponding to arrow section $a_3$ is of a lower temperature and produces a heat transfer effect less than that of the section corresponding to arrow section $a_2$, the second section $a_4$ of the upper half portion, as before said, producing the smallest heat transfer effect. Consequently, with a heating medium flowing through heat exchanger 1, the air passing through line or conduit 11 is relatively cooler than the one through line 12 and, as a matter of fact, is the relatively coolest air portion which leaves the heat exchanger 1. Air which is slightly warmer than the air flowing through line or conduit 11 flows through line 13 while air which is somewhat cooler than that flowing through line 12 flows through line or conduit 14.

It should also be noted that the collecting air chamber 6 thereby exercises a certain equalization effect. However, if this equalization effect is to be minimized if not completely eliminated, then the air collecting chamber 6 may also be subdivided by a horizontal and/or vertical built-in separating wall 15 into two or four sectors, although these may be omitted where desired. The wall 15 shown in FIGURES 1 and 2 is of the vertical type. A fine adjustment of the air flow through the lines 11 to 14 may thereby be realized by the pivotal movement of both control valve members 9 and 10.

The arrangement in accordance with the present invention may be readily accommodated in a hollow cross bearer member of the vehicle frame or vehicle body or also within the space of the double-walled fire wall, for example, at the height of the instrument board. The line or conduit 12 thereby leads to the foot space 16 of the passenger seated alongside of the driver, the line 14 to the foot space 16' of the driver, the line 13 to the defroster nozzle 17' at the windshield 19 and possibly also at the vehicle lateral windows 18 on the driver side, and the line 11 to the defroster nozzle 17 on the passenger side.

The heating installation described hereinabove may also be used for purposes of cooling the vehicle interior space if, instead of the heating medium, a cooling medium is permitted to flow through the heat exchanger 1. Any suitable cooling installation, known in the prior art, may thereby be connected with the heat exchanger for that purpose. Moreover, the heat exchanger may also be so arranged that it may be selectively connected with either the heated cooling medium from the internal combustion engine or a refrigerant from the air-conditioning unit.

Additionally, recirculating air ducts may be provided which recirculate the air from within the vehicle space into the line or conduit 2 ahead of the heat exchanger 1.

While I have shown and described one embodiment in accordance with the present invention, it is understood that the same is not limited thereto but is susceptible of many changes and modifications within the spirit and scope of the present invention, and I, therefore, do not wish to be limited to the embodiment illustrated herein but intend to cover all such changes and modifications as are encompassed by the scope of the appended claims.

I claim:
1. A ventilating installation for vehicles comprising vertically disposed heat exchanger means having spaced front and rear faces and adapted to effect a change in the temperature of the air passing therethrough and having inlet means and outlet means for the admission and discharge of a flow medium through said heat exchanger means in heat transfer relationship to said air, said heat exchanger means including a horizontal partition wall subdividing said heat exchanger means into upper and lower half portions, means providing a flow of said medium in opposite directions through said half portions including means in said lower half portion receiving said medium from said inlet means and means in said upper half portion discharging said medium to said outlet means, said portions comprising successive sections each having temperatures lower than those of the preceding section, air inlet means communicating with said front face of said heat exchanger means and supplying air for parallel paths of air flow defined by said upper and lower half portions, distributing means for said air including four line means adapted to lead to various parts within the vehicle interior space, and means operatively connecting said four line means with said rear face of said heat exchanger means including two spaced discharge aperture means, one of said two aperture means being disposed adjacent to and communicating with one of said sections having the highest temperature and with a first of said four line means, said one of said two aperture means being further adjacent to and communicating with another of said sections having the lowest temperature and with a fourth of said four line means, the other of said two aperture means being disposed adjacent to and communicating with one of said sections having the second highest temperature and with a second of said four line means, said other of said two aperture means being further adjacent to and communicating with one of said sections having the third highest temperature and with the third of said line means, the initial portions of said first and fourth line means being mutually adjacent and the initial portions of said second and third line means being mutually adjacent.

2. A ventilating installation for vehicles according to claim 1, wherein said inlet and outlet means are disposed one above the other on the same side of said heat exchanger means with said medium flowing into said heat exchanger means from below and being discharged on top thereof.

3. A ventilating installation according to claim 1, wherein said first of said four line means is adapted to lead to the foot space of the passenger seated beside the driver, said second of the said four line means is adapted to lead to the foot space of the driver, said third of said four line means is adapted to lead to defroster nozzles on the driver's side, and said fourth of said four line means is adapted to lead to defroster nozzles on the passenger side.

4. A ventilating installation according to claim 1, further comprising means for selectively opening and closing said four line means including valve means for the pair of line means constituted by said first and fourth of said four line means, and further valve means for the pair of line means constituted by said second and third line means.

5. A ventilating installation according to claim 1, wherein said heat exchanger means further includes partition wall means extending transversely of said horizontal partition wall and across said half portions.

6. A ventilating installation according to claim 4, wherein said first-named valve means comprise a valve member common to said first-named pair of line means, and said further valve means comprise a valve member common to said second-named pair of line means.

References Cited in the file of this patent
UNITED STATES PATENTS

| | | |
|---|---|---|
| 2,860,567 | Wilfert | Nov. 18, 1958 |
| 3,032,324 | Fiala | May 1, 1962 |

FOREIGN PATENTS

| | | |
|---|---|---|
| 1,132,271 | France | Mar. 7, 1957 |

OTHER REFERENCES
German application D 11,651, II/63c, printed Feb. 23, 1956.